US012731972B2

(12) United States Patent
Petersen

(10) Patent No.: US 12,731,972 B2
(45) Date of Patent: Sep. 8, 2026

(54) ADJUSTABLE SPACER FOR HOLDING SUPPLY LINES

(71) Applicant: Airbus Operations GmbH, Hamburg (DE)

(72) Inventor: Lauritz Petersen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 14 days.

(21) Appl. No.: 18/905,559

(22) Filed: Oct. 3, 2024

(65) Prior Publication Data

US 2025/0122958 A1 Apr. 17, 2025

(30) Foreign Application Priority Data

Oct. 13, 2023 (EP) .................................... 23203432

(51) Int. Cl.

| | |
|---|---|
| ***H02G 3/32*** | (2006.01) |
| ***B64C 1/40*** | (2006.01) |
| ***B64D 47/00*** | (2006.01) |
| ***F16L 3/12*** | (2006.01) |
| ***F16L 3/127*** | (2006.01) |
| ***F16L 3/20*** | (2006.01) |

(Continued)

(52) U.S. Cl.

CPC ............... *H02G 3/32* (2013.01); *B64C 1/406* (2013.01); *B64D 47/00* (2013.01); *F16L 3/1218* (2013.01); *F16L 3/127* (2013.01); *F16L 3/20* (2013.01); *H02G 3/26* (2013.01); *H02G 3/30* (2013.01)

(58) Field of Classification Search

CPC . F16L 3/20; F16L 3/127; F16L 3/1218; B64C 1/406; H02G 3/32; H02G 3/26; H02G 3/30; B64D 47/00

See application file for complete search history.

(56) References Cited

U.S. PATENT DOCUMENTS

| | | | | |
|---|---|---|---|---|
| 8,678,332 | B2 * | 3/2014 | Benthien | B64C 1/406 248/205.3 |
| 8,888,053 | B2 * | 11/2014 | Blanchard | B64C 1/406 248/74.1 |
| 9,168,997 | B2 * | 10/2015 | Blanchard | H02G 3/32 |

(Continued)

FOREIGN PATENT DOCUMENTS

| | | | | |
|---|---|---|---|---|
| CN | 112178285 A * | 1/2021 | | F16L 3/221 |
| CN | 215646028 U | 1/2022 | | |

(Continued)

OTHER PUBLICATIONS

European Search Report for corresponding European Patent Application No. 23203432.2 dated Mar. 28, 2024.

*Primary Examiner* — Eret C Mcnichols

(74) *Attorney, Agent, or Firm* — Greer, Burns & Crain, Ltd.

(57) ABSTRACT

An extendable holding device including a supply line holding unit, a fastener and an adaptable spacer. The supply line holding unit includes an at least partly enclosed holding opening for holding a supply line. The fastener is configured to mount the supply line holding unit to a support structure. The adaptable spacer is configured to be arranged between the supply line holding unit and the support structure to which the holding device is to be mounted. The adaptable spacer is extendable in a longitudinal direction of the fastener and is temporarily lockable at least at a first and a second predetermined length.

16 Claims, 6 Drawing Sheets

(51) Int. Cl.
*H02G 3/00* (2006.01)
*H02G 3/30* (2006.01)

(56) References Cited

U.S. PATENT DOCUMENTS

| | | | | | |
|---|---|---|---|---|---|
| 9,562,626 | B2 * | 2/2017 | Gustin | .................... | F16L 3/127 |
| 10,029,835 | B1 * | 7/2018 | Cuddy | .................. | F16L 3/2334 |
| 10,096,934 | B1 * | 10/2018 | Desjardins | ......... | H01R 13/5841 |
| 10,197,254 | B2 * | 2/2019 | Crandell | ................... | F21S 4/28 |
| 10,250,024 | B2 * | 4/2019 | Eyles | ................... | H02G 3/0437 |
| 10,533,597 | B2 * | 1/2020 | Benthien | ............... | F16B 37/085 |
| 10,774,951 | B2 * | 9/2020 | Ball | ........................ | F16L 3/127 |
| 12,228,229 | B1 * | 2/2025 | Mumma | ................. | H02S 20/23 |
| 2006/0090806 | A1 * | 5/2006 | Friedline | ............... | F16L 3/1075 |
| | | | | | 248/62 |
| 2008/0121273 | A1 * | 5/2008 | Plaisted | .................. | H02S 20/24 |
| | | | | | 136/251 |
| 2018/0356007 | A1 * | 12/2018 | Waters | .................. | F16L 3/1222 |
| 2021/0194410 | A1 * | 6/2021 | Yang | ....................... | H02S 20/23 |
| 2025/0226646 | A1 * | 7/2025 | Bonilla | ..................... | F16L 3/20 |

FOREIGN PATENT DOCUMENTS

| | | | | | |
|---|---|---|---|---|---|
| CN | 215772328 | U | | 2/2022 | |
| CN | 218102482 | U | | 12/2022 | |
| DE | 2345843 | A1 | * | 3/1975 | |
| DE | 102015106273 | A1 | * | 10/2016 | ............... H02G 3/32 |
| DE | 102020100144 | A1 | * | 6/2021 | ............. H02S 30/00 |
| EP | 2485352 | A1 | * | 8/2012 | ............... H02G 3/32 |
| FR | 2983558 | A1 | * | 6/2013 | ................ F16L 3/23 |
| JP | 2016163433 | A | * | 9/2016 | |
| JP | 2017147860 | A | * | 8/2017 | |
| KR | 20250005931 | A | * | 1/2025 | ................ F16B 2/08 |

* cited by examiner

ADJUSTABLE SPACER FOR HOLDING SUPPLY LINES

CROSS-REFERENCES TO RELATED APPLICATIONS

This application claims the benefit of European Patent Application Number 23203432.2 filed on Oct. 13, 2023, the entire disclosure of which is incorporated herein by way of reference.

FIELD OF THE INVENTION

The present invention relates to a way of separating supplies from a support structure, more specifically the invention relates to an extendable holding device, a supply line arrangement, an energy supply system, an aircraft and a method for providing the extendable holding device for a supply line in an aircraft.

BACKGROUND OF THE INVENTION

In vehicles, like aircraft, supply lines may be used, for example cables for signal transmission or ducts or other lines. These supply lines can be mounted to structural parts of the vehicle, such as frames or stringers of a fuselage of the aircraft. The supply lines may be mounted by supports or holders to run in a predetermined distance from the structural parts. However, it has been shown that due to different distances applied, mounting of the supply lines with such supports may be cumbersome and means an elaborate and time-consuming task.

SUMMARY OF THE INVENTION

There may thus be a need for a simpler, easier, more reliable, more accurate and less time- and material consuming way in mounting supply lines in predetermined distances.

An object of the present invention is solved by the subject-matter of the claims. It should be noted that the following described aspects of the invention apply also for the extendable holding device, for the supply line arrangement, for the energy supply system, for the aircraft and for the method for providing the extendable holding device for a supply line in an aircraft.

According to the present invention, an extendable holding device for a supply line in an aircraft is provided. The holding device comprises a supply line holding unit, a fastener and an adaptable spacer. The supply line holding unit comprises an at least partly enclosed holding opening for holding a supply line. The fastener is configured to mount the supply line holding unit to a support structure. The adaptable spacer is configured to be arranged between the supply line holding unit and the support structure to which the holding device is to be mounted. The adaptable spacer is extendable in a longitudinal direction of the fastener and is temporarily lockable at least at a first and a second predetermined length.

As an effect, a variety of discrete and predetermined distances between at least one supply line and a support structure can be set by a single adaptable spacer.

As an advantage, the adaptable spacer does not need to be preassembled from various parts for providing a variety of discrete and predetermined distances.

As a further advantage, time for mounting at least one supply line to a support structure is reduced.

According to an example, the adaptable spacer is extendable by means of comprising a first spacer member and at least a second spacer member. The first spacer member is lockable at the at least second spacer member at least at the first and the second predetermined length. The first and the at least second spacer member have a disengaged state between at least the first and the second predetermined length and are continuously shiftable in the longitudinal direction with respect to each other.

According to an example, at least one of the first spacer member and the at least second spacer member comprises locking elements for locking the adaptable spacer at least at the first and the second predetermined length.

According to an example, at least a part of the adaptable spacer encloses the fastener. The locking elements are configured to be secured by the fastener to prevent disengagement of the locking of the first and the at least second spacer member.

According to an example, the adaptable spacer comprises at least one marker element at the first and/or second predetermined length. The marker element is configured for indicating a length between the supply line holding unit and the support structure.

According to the present invention, also a supply line arrangement is provided. The supply line arrangement comprises an extendable holding device according to one of the previous examples, at least one supply line and a support structure. The at least one supply line is mounted onto the support structure by the extendable holding device at a distance defined by the extendable holding device.

As an advantage, time for setting up the supply line arrangement is reduced.

According to the present invention, also an energy supply system is provided. The energy supply system comprises at least one supply line arrangement according to the previous example and a power source. The power source is connected to the at least one supply line arrangement to supply electric energy to power consuming loads.

As an advantage, time for setting up the energy supply system is reduced.

According to the present invention, also an aircraft is provided. The aircraft comprises at least one energy supply system according to the previous example and at least one power consuming load. The least one power consuming load comprises at least one of the group of: a propulsion system, electric avionic equipment and onboard electric devices for a cabin area. The least one power consuming load is powered by the at least one energy supply system.

As an advantage, construction time for manufacturing and retrofitting an aircraft is reduced.

According to the present invention, also a method is provided. The method for providing an extendable holding device for a supply line in an aircraft, comprises the following steps:

Providing a supply line holding unit,

Providing a fastener, and

Providing an adaptable spacer. The supply line holding unit comprises an at least partly enclosed holding opening for holding a supply line. The fastener is configured to mount the supply line holding unit to a support structure. The adaptable spacer is configured to be arranged between the supply line holding unit and the support structure to which the holding device is to be mounted. The adaptable spacer is extendable in a longitudinal direction of the fastener and is temporarily lockable at least at a first and a second predetermined length.

According to an aspect, an extendable, also referred to as stretchable, support post for a cable or other line mounting is provided. The support post is used to set the distance between a cable at the cable mounting and a mounting area by its length, e.g., setting the vertical distance. To set the distance, the two-part support post can simply be pulled out to snap into arresting positions in a desired predetermined length. In this manner, an easier segregation of the support post in different lengths is achieved. The support post is fastened by the cable mounting at the mounting area to establish the distance between the cable and the mounting area, while the support post imposes its predetermined length on the cable mounting. The distance can also be reset by unsnapping the support post if the cable mounting is already fastened at the mounting area.

According to an aspect, a post for a supply line hold is provided with at least two different pre-given lengths. The post snaps into the positions and is then clamped by, e.g., a screw. Due to snapping into only the predetermined positions, the post is easily adjustable when mounting the post.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF THE PREFERRED EMBODIMENTS

Figure 1:
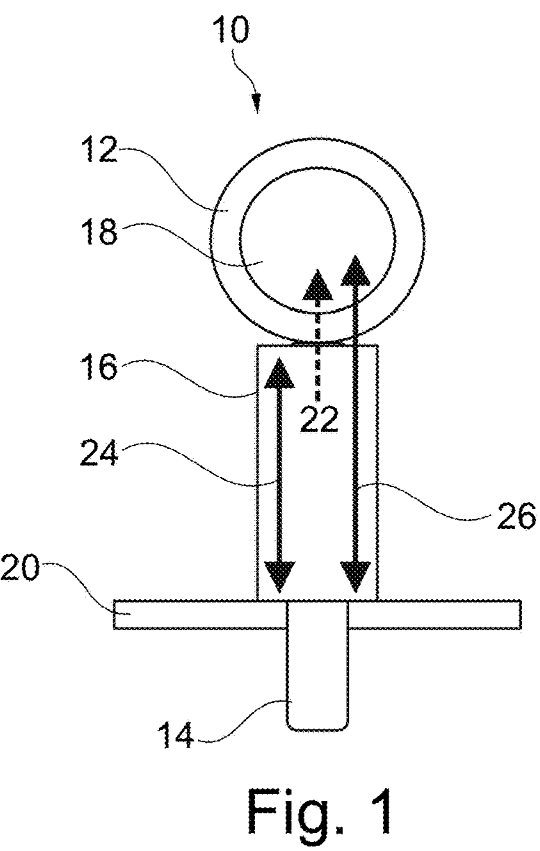
FIG. 1 schematically shows a general scheme of an example of an extendable holding device.

Certain embodiments will now be described in greater detail with reference to the accompanying drawings. In the following description, like drawing reference numerals are used for like elements, even in different figures. The matters defined in the description, such as detailed construction and elements, are provided to assist in a comprehensive understanding of the exemplary embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

In an example, for electrical bundle installation within an aircraft it is necessary to keep segregation of the bundle to the environment, e.g., primary structure and other systems.

FIG. 1 schematically shows a general scheme of an example of an extendable holding device 10. The extendable holding device 10 for a supply line in an aircraft comprises a supply line holding unit 12, a fastener 14 and an adaptable spacer 16. The supply line holding unit 12 comprises an at least partly enclosed holding opening 18 for holding a supply line, not shown in FIG. 1. The fastener 14 is configured to mount the supply line holding unit 12 to a support structure 20. The adaptable spacer 16 is configured to be arranged between the supply line holding unit 12 and the support structure 20 to which the holding device 10 is to be mounted. The adaptable spacer 16 is extendable, as shown by arrow 22 in FIG. 1, in a longitudinal direction of the fastener 14 and is temporarily lockable at least at a first and a second predetermined length 24, 26.

The term "holding device" relates to a support or a suspension for a supply line.

The term "supply line" relates to a cable, a piping or a tubing, that can supply energy or a mass flow in, e.g., an aircraft, not shown in FIG. 1.

The adaptable spacer 16 can also be referred to as spacer.

The term "supply line holding unit" relates to an entity capable of fixedly keeping at least one supply line or a bundle of supply lines.

The term "fastener" relates to a fastening structure like a screw with a sleeve, a bolt, a nail.

In an example, the supply line holding unit 12 is fixedly held at the support structure 20 by the head of the screw, the bolt or the nail, not shown in FIG. 1.

In an example, the head of the screw, the bolt or the nail is configured as the supply line holding unit 12, such that the supply line holding unit 12 and the fastener 14 are made from a single piece.

The term "adaptable spacer" relates to a support post, support column, pillar, strut, stand extending in a longitudinal direction that can be changed reversibly in its length in the longitudinal direction.

In an example, the adaptable spacer 16 comprises reinforcing structures to prevent bending between the supply line and the support structure 20, not shown in FIG. 1.

In an example, the adaptable spacer 16 is made from an electrically insulating material.

In an example, the adaptable spacer 16 is made from a thermally insulating material.

In an example, the adaptable spacer 16 is made from polymeric material.

In an example, the adaptable spacer 16 is made from a composite material.

In an example, the composite material comprises fibrous material.

In an example, the composite material comprises CFRP.

In an example, the adaptable spacer 16 is configured to withstand a pressure of a vertical preload force of the fastener 14, not shown in FIG. 1. The preload force results from fastening of the adaptable spacer 16 and the supply line holding unit 12 to the support structure 20 by the fastener 14.

The term "partly enclosed holding opening" relates to a clamp that is able to hold a bundle of a least one supply line.

In an example, the holding opening 18 is configured to be adaptable to the diameter of the bundle of a least one supply line, not shown in FIG. 1.

In an example as shown in FIG. 1, the center of the holding opening 18 is aligned with the central longitudinal axis of the fastener 14.

In an example, not shown in FIG. 1 the center of the holding opening 18 lies next to the central longitudinal axis of the fastener 14.

In an example, the holding opening 18 is configured to be flexible with respect to shearing forces of the bundle of a least one supply line.

The term "support structure" relates to any entity that is a structural part of a vehicle, not shown in FIG. 1.

The term "support structure" relates to any entity that is a structural part of an aircraft, not shown in FIG. 1.

In an example, the support structure 20 is a stand, a post, a wall or a support strut of the primary structure of an aircraft, not shown in FIG. 1.

The term "extendable" relates to the property of the adaptable spacer 16 in changing its length in a longitudinal direction.

The term "longitudinal direction" relates to a direction that is parallel to an area-normal of the support structure 20.

The term "temporarily lockable" describes that the adaptable spacer 16 can be reversibly changed in its extended length, such that no extendable spacer needs to be discarded if the wrong length has been set. Lockable means that the adaptable spacer 16 does not change is extended length unintentionally, i.e., spontaneously if this is not required. Lockable means, that the adaptable spacer 16 does not change is length when it is locked due to gravitational forces, or pressure or tensile forces occurring during mounting of the at least one supply line.

The term "a first and a second predetermined length" relates to distances between the supply line, not shown in FIG. 1, in the supply line holding unit 12 and the support structure 20.

In an example, more than two lengths like three, four, five, six and so on lengths can be chosen at a single spacer, not shown in FIG. 1.

In an example, the lengths comprise discrete, i.e., quantized length values and the adaptable spacer 16 can be adjusted in its length to these discrete values.

In an example, the first length is 12 mm, the second length is 14 mm and the third length is 16 mm.

Figure 2:
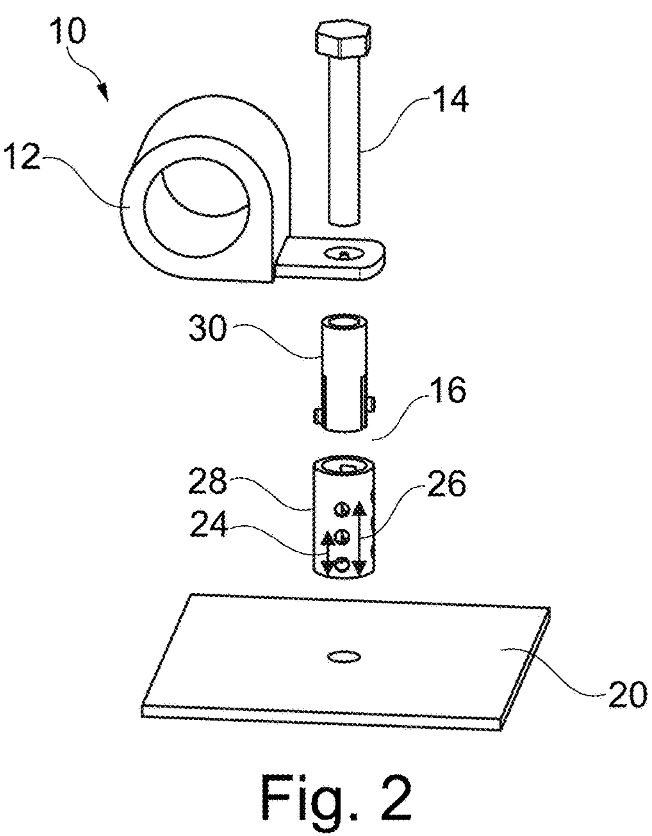
FIG. 2 shows an example of an extendable holding device.

FIG. 2 shows an example of an extendable holding device 10. The adaptable spacer 16 is extendable by means of comprising a first spacer member 28 and at least a second spacer member 30. The first spacer member 28 is lockable at the at least second spacer member 30 at least at the first and the second predetermined length 24, 26. The first and the at least second spacer member 30 have a disengaged state between at least the first and the second predetermined length 24, 26 and are continuously shiftable in the longitudinal direction with respect to each other.

The term "first spacer member" relates to a portion of the adaptable spacer 16 that abuts the support structure 20.

In an example, the first spacer member 28 abuts the supply line holding unit 12, as shown in FIG. 2.

The term "second spacer member" relates to a portion of the adaptable spacer 16 that abuts the supply line holding unit 12, as shown in FIG. 2.

In an example, the second spacer member 30 abuts the support structure 20, not shown in FIG. 2.

In an example, the supply line holding unit 12 and the first spacer member 28 or the second spacer member 30 are manufactured from a single piece, not shown in FIG. 2.

The term "disengaged state" relates to the adaptable spacer 16 being in a state, where it can be changed to any length between the at least first and second predetermined length 24, 26. This length is not wanted and hence not lockable, i.e., settable, by engagement of the locking elements.

The term "continuously shiftable" relates to the first and the at least second member being freely shiftable, glideable, floating, and buoying.

In an example, the first spacer member 28 is formed as a guiding rail for slidingly guiding the second spacer member 30 during an extension of the extendable holding device 10, as shown in FIG. 2.

The terms first spacer member 28 and second spacer member 30 can also be referred to as outer spacer part and inner spacer part.

Figure 3:
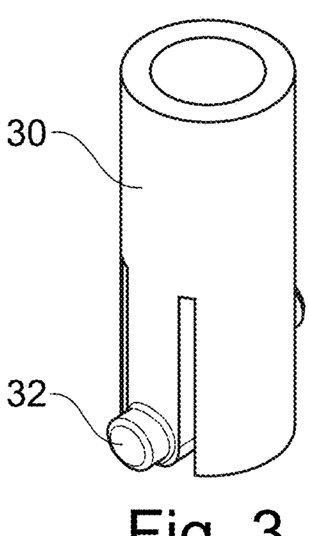
FIG. 3 shows an example of a second spacer member.

FIG. 3 shows an example of a second spacer member 30. At least one of the first spacer member 28 and the at least second spacer member 30 comprises locking elements 32 for locking the adaptable spacer 16 at least at the first and the second predetermined length 24, 26, not shown in FIG. 3.

The term "locking elements" relates to entities at the first and the at least second spacer member 30 that allow the adaptable spacer 16 to be fixedly hold at a certain length by interlocking, as shown in FIG. 3.

In an example, the locking elements 32 comprise entities that enhance the friction force between the first spacer member 28 and the at least second spacer member 30 at the desired length, as shown in FIG. 3.

In an example, the locking elements 32 protrude from the surface of the first spacer member 28 or the at least second spacer member 30, as shown in FIG. 3.

In an example, the locking elements 32 comprise recesses in the surface of the first spacer member 28 or the at least second spacer member 30, not shown in FIG. 3.

In an example, the locking elements 32 enhance the friction forces between the first spacer member 28 and the at least second spacer member 30 by pointing away from the longitudinal direction of the first spacer member 28 and the at least second spacer member 30.

In an example, the locking elements 32 point in horizontal direction, transverse to the longitudinal direction, as shown in FIG. 3.

In an example, the locking elements 32 comprise nubs, holes, projections, cones, wedges, or mushroom head shape projections, not shown in FIG. 3.

Figure 4:
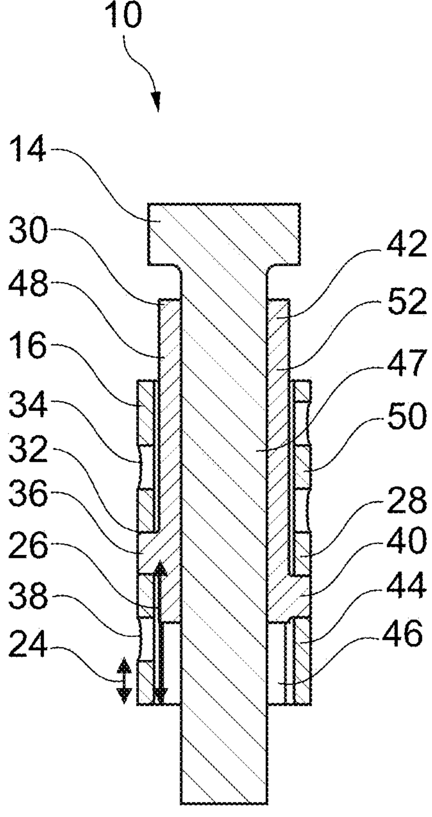
FIG. 4 shows a cross section through an example of an extendable holding device.

FIG. 4 shows a cross section through an example of an extendable holding device 10. The locking elements 34 at the first spacer member 28 are complementary to the locking elements 36 at the at least second spacer member 30.

The term "complementary" relates to the locking elements 34, 36 providing a male to female connection such that their interlocking is enhanced.

In an example, the locking elements 34, 36 relate to the locking elements 34 at the first spacer member 28 and to the locking elements 36 at the at least second spacer member 30. The locking elements 32 comprise the locking elements 34 at the first spacer member 28 and the locking elements 36 at the at least second spacer member 30, also referred to as locking elements 34, 36.

In an example, the first spacer member 28 comprises holes, recesses, blind holes and pockets that are engaged or interlocked with corresponding projections protruding from the surface of the at least second spacer member 30, as shown in FIG. 4.

In an example, the first spacer member 28 comprises wedge or cone-like projections at the surface and the second spacer member 30 comprises corresponding form-fit recesses or holes.

In an example of FIG. 4, the locking elements 34, 36 are arranged in a staggered pattern 38 at the first spacer member 28 and/or the at least second spacer member 30 to reinforce the locking 40 of the first and the at least second spacer member 30.

The term "staggered pattern" relates to a twofold set of locking elements 34, 36, i.e., on opposing sites of the first spacer member 28 and/or the at least second spacer member 30, that provide an additional locking site at the at least first and second predetermined length 24, 26, as shown in FIG. 4. The additional locking enhances the interlocking and the connection against tensile or pressure forces acting on the first and the second spacer member 30.

In an example, a second hole pattern of the twofold set of locking elements 34 is in a 90° arrangement to a first hole pattern. This increases possible steps/heights of the spacer. More hole patterns are possible for even more positions.

As an advantage, the adaptable spacer can be more strongly fixed to the support structure 20 by the fastener.

As an advantage, the staggered arrangement of a hole pattern increases the amount of material between holes and allows a more robust design.

In an example not shown in FIG. 4, the locking elements 34, 36 are configured, such that their locking 40 is enabled by a preload force.

In an example, a nub, as a locking element, is connected to the first and/or the at least second spacer member 30 via a spring-like element. If the nub is engaged into its corresponding hole at the first and/or the at least second spacer member 30, their interlocking can be released by pressing against the nub in the hole and shifting the first spacer member 28 with respect to the at least second spacer member 30.

In an example, the locking 40 between the locking elements 34, 36 can also be carried out by nub-clipping, not shown in FIG. 4. A male locking element comprises a nub and the female locking element comprises an elastic and opened hole. The male locking element is engageable in the female locking element by a rotation of the first spacer member 28 against the at least second spacer member 30 to shift the nub in the elastic hole.

As an advantage, a spring mechanism allows for re-adjustment/de-installation of the two spacer parts without destroying the parts.

As an advantage, the spring mechanism allows for re-adjustment/de-installation of the two spacer parts if the supply line is already mounted by and at the extendable holding device.

As a further advantage, if an incorrect predetermined length has been chosen, no disassembling of the supply line is required.

As an advantage, a spring mechanism of the second spacer member 30 locks its nubs automatically in hole pattern of the first spacer member 28.

In an example shown in FIG. 4, at least a part 42 of the adaptable spacer 16 encloses the fastener 14. The locking elements 34, 36 are configured to be secured by the fastener 14 to prevent disengagement of the locking 40 of the first and the at least second spacer member 30.

The term "encloses" relates to a form-fit connection of the adaptable spacer 16 to the fastener 14, such that forces can be exchanged between the adaptable spacer 16 and the fastener 14, as shown in FIG. 4.

In an example, the nub is engaged into its corresponding hole forming an interlocking connection. Tensile forces acting between the first spacer member 28 and the at least second spacer member 30 might however lead to an unwanted disengagement of their locking 40, as shown in FIG. 4. In an example, this unwanted disengagement is prevented by means of the fastener 14 holding the nub in its hole while the tensile forces are acting. The fastener 14 holds the nub in its hole while also being connected to the adaptable spacer 16 and guiding the forces, that act on the nub into the support structure 20 and the adaptable spacer 16.

The term "secured" relates to the fastener 14 blocking the release of the locking 40 between the locking elements 34, 36, as shown in FIG. 4.

In an example, the fastener 14 blocks the disengagement while it is mounted to the support structure 20.

In an example, the fastener 14 blocks the disengagement while it is enclosed by the adaptable spacer 16 comprising the locking elements 34, 36, as shown in FIG. 4.

As an advantage, self-unlocking of the adaptable spacer 16 for example due to vibration is not possible.

In an example of FIG. 4, the first spacer member 28 is formed as a primary hollow cylinder 44, providing an inner volume 46. The at least second spacer member 30 is formed as secondary hollow cylinder 48, being insertable into the inner volume 46 of the primary hollow cylinder 44. The secondary hollow cylinder 48 encloses the fastener 14 in its inner volume 46. The locking elements 34, 36 are provided from a primary and a secondary hollow cylinder wall 50, 52. The fastener 14 secures the locking elements 36 of the secondary hollow cylinder wall 52 against the locking elements 34 of the primary hollow cylinder wall 50.

The term "hollow cylinder" relates to a tubular structure enclosing an inner lumen with its tube wall. The inner lumen is accessible at both ends of the tubular structure.

The term "hollow cylinder wall" relates to the solid material enclosing the inner lumen of the tubular structure.

In an example, the locking elements 34, 36 of the secondary hollow cylinder 48 generate a preload force, when being inserted in the primary hollow cylinder 44, as the circumference or radius they define at the secondary hollow cylinder 48 is larger than the radius of the inner volume 46 of the primary hollow cylinder 44, as can be deduced from FIG. 4. The preload force is released when the locking elements 36 of the secondary hollow cylinder 48 match and engage with the locking elements 34 of the primary hollow cylinder 44 to form a locking connection. The engagement of these locking elements 34, 36 can be blocked with the fastener 14 in an inner volume 47 of the secondary hollow cylinder 48.

In an example, while the locking elements 34, 36 are manufactured from the cylinder wall, the locking elements 34, 36 are arranged in a pattern at the cylinder walls to keep the standing stability of the adaptable spacer 16, as shown in FIG. 4.

In an example, the primary hollow cylinder 44 abutting the support structure 20 is insertable into the secondary hollow cylinder 48 abutting the supply line holding unit 12, not shown in FIG. 4, and both are interlocked and their interlocking is secured by the fastener 14.

As an advantage, weight is reduced while stability is gained through tubular, cylindrical structures.

As a further advantage, material costs are reduced.

As an advantage, manufacturing is easier and faster.

Figure 5:
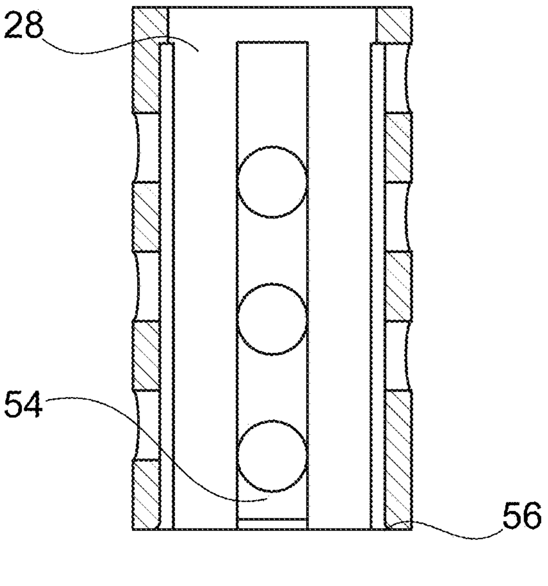
FIG. 5 shows a cross section through an example of a first spacer member.

FIG. 5 shows a cross section through an example of a first spacer member 28. The first spacer member 28 and the at least second spacer member 30 are rotatably locked in relation to each other, not shown in FIG. 5.

In an option of FIG. 5 and preferably, the first spacer member 28 or the at least second spacer member 30 comprises a guiding groove 54 and the other member comprises a guiding pin engaged with the guiding groove.

In an option of FIG. 5 and preferably, the guiding groove 54 and guiding pin prevent a separation of the first spacer member 28 and the at least second spacer member 30.

The term "rotatably locked" relates to the first spacer member 28 being inserted in the at least second spacer member 30, not shown in FIG. 5, or vice versa only by translation not by rotation, turning or twisting.

The term "guiding groove" relates to a linear deepening following the longitudinal direction of the first spacer member 28, the at least second spacer member 30 and the fastener 14, not shown in FIG. 5.

The term "guiding pin" relates to a projection that is engageable with the guiding groove 54. Guiding pin and guiding groove 54 restrict the degree of freedom of movement of the first spacer member 28 with respect to the at least second spacer member 30 to a translation in a longitudinal direction. This way, the locking elements 34, 36 at the first spacer member 28 and the at least second spacer member 30 can be engaged in a more targeted way, not shown in FIG. 5.

The term "separation" relates to the first spacer member 28 having no contact to the at least second spacer member 30, as shown in FIG. 5.

In an example, the guiding pin is a locking element 34, 36.

In an example, the outer part, the first spacer member 28, comprises an end stop for the inner part, the second spacer member 30, as backup to prevent de-attachment of these members during operation.

As an advantage, mounting time of the adaptable spacer is reduced, since locking of the adaptable spacer can simply be realized by translation of the first spacer member 28 with respect to the at least second spacer.

In another option of FIG. 5, the first spacer member 28 and/or the at least second spacer member 30 comprise insertion aiding elements 56 at their end portions to facilitate insertion of the at least second spacer member 30 into the first spacer member 28.

The term "insertion aiding elements" relates to beveled edges of the end portions of the first spacer member 28 and/or the at least second spacer member 30.

The insertion aiding element can also be referred to as insert edge.

As an advantage, preassembling time of the extendable spacer is reduced.

Figure 6:
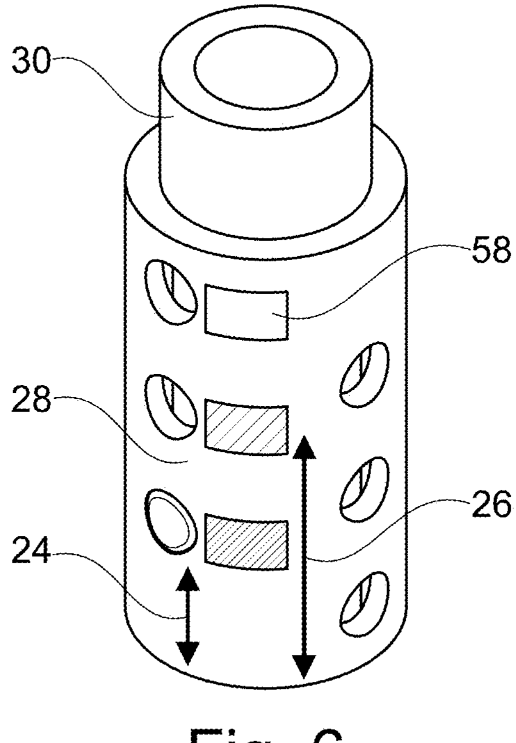
FIG. 6 shows an example of a first and at least second spacer member comprising marker elements.

FIG. 6 shows an example of a first and at least second spacer member 30 comprising marker elements. The adaptable spacer 16 comprises at least one marker element 58 at the first and/or second predetermined length 24, 26. The marker element 58 is configured for indicating a length between the supply line holding unit 12, not shown in FIG. 6, and the support structure 20.

The term "marker element" relates to an entity that indicates a length by optical and/or acoustic signals and/or chemical and/or mechanical signals.

In an example, the marker element 58 is a profile embossed into the adaptable spacer 16, i.e., the first spacer member 28 and the at least second spacer member 30, not shown in FIG. 6.

The marker element 58 can also be referred to as label.

In an example, the marker element 58 comprises a color coding for each length, i.e., distance of the supply line to the support structure 20.

In an example, the marker element 58 describes the distance in millimeters of the supply line to the support structure 20, not shown in FIG. 6.

As an advantage, the distance between the supply line and the support structure 20 can be set comfortably.

As an advantage, controlling of the distance between the supply line and the support structure 20 is facilitated.

Figure 7:
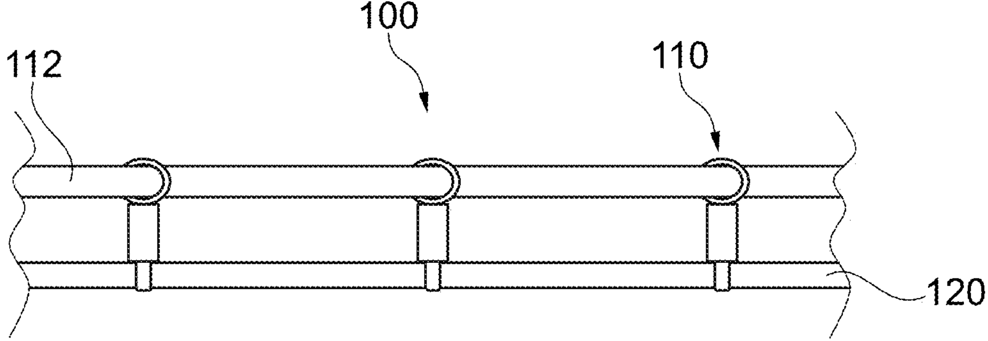
FIG. 7 schematically shows a general scheme of an example of a supply line arrangement.

FIG. 7 schematically shows a general scheme of an example of a supply line arrangement 100. The supply line arrangement 100 comprises an extendable holding device 110 according to one of the previous examples and options, at least one supply line 112 and a support structure 120. The at least one supply line 112 is mounted onto the support structure 120 by the extendable holding device 110 in a distance defined by the extendable holding device 110.

Figure 8:
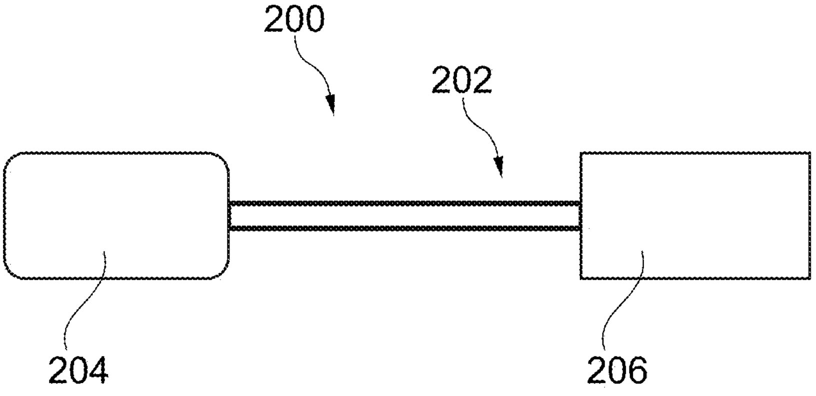
FIG. 8 schematically shows a general scheme of an example of an energy supply system.

FIG. 8 schematically shows a general scheme of an example of an energy supply system 200. The energy supply system 200 comprises at least one supply line arrangement 202 according to the previous example and a power source 204. The power source 204 is connected to the at least one supply line arrangement 202 to supply electric energy to power consuming loads 206.

Figure 9:
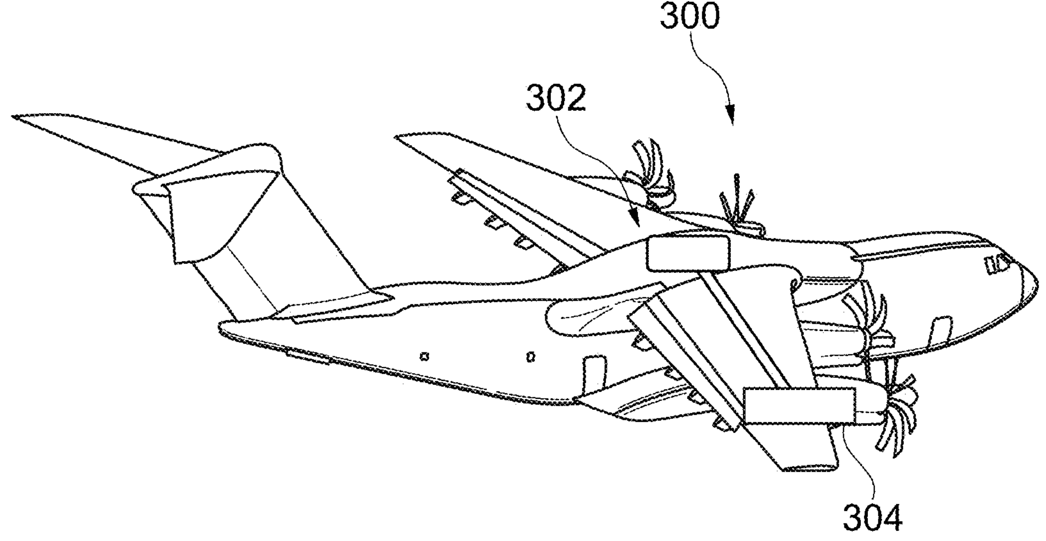
FIG. 9 schematically shows an example of an aircraft comprising at least one energy supply system.

FIG. 9 schematically shows an example of an aircraft 300 comprising at least one energy supply system 302. The aircraft 300 comprises at least one energy supply system 302 according to the previous example and at least one power consuming load 304. The least one power consuming load 304 comprises at least one of the group of: a propulsion system, electric avionic equipment and onboard electric devices for a cabin area. The least one power consuming load 304 is powered by the at least one energy supply system 302.

Figure 10:
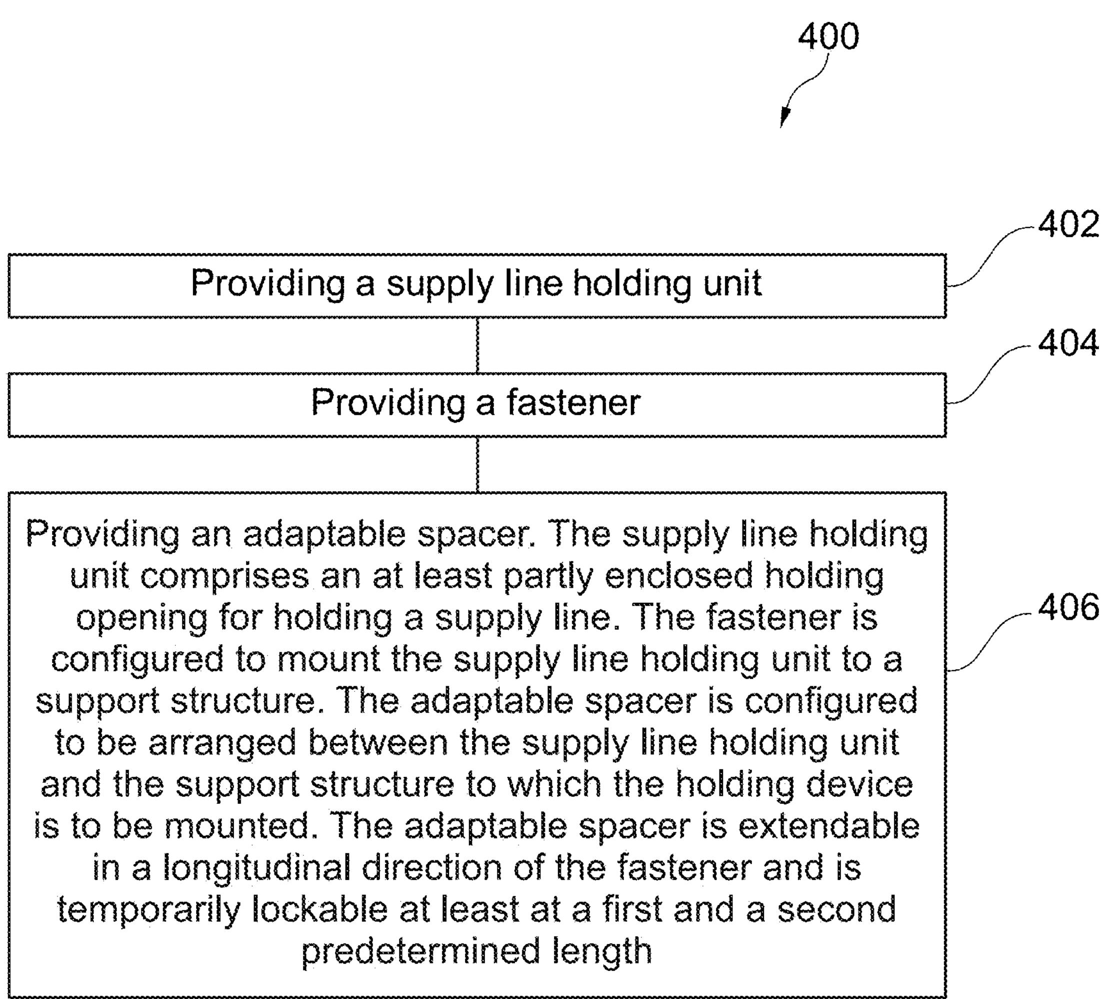
FIG. 10 shows basic steps of an example of a method for providing an extendable holding device for a supply line in an aircraft.

FIG. 10 shows basic steps of an example of a method 400 for providing an extendable holding device 10 for a supply line in an aircraft. The method 400 comprises, with reference to FIG. 1, the following steps:

In a first step 402 a supply line holding unit 12 is provided,

In a second step 404 a fastener 14 is provided, and

In a third step 406 an adaptable spacer 16 is provided. The supply line holding unit 12 comprises an at least partly enclosed holding opening 18 for holding a supply line. The fastener 14 is configured to mount the supply line holding unit 12 to a support structure 20. The adaptable spacer 16 is configured to be arranged between the supply line holding unit 12 and the support structure 20 to which the holding device 10 is to be mounted. The adaptable spacer 16 is extendable in a longitudinal direction of the fastener 14 and is temporarily lockable at least at a first and a second predetermined length 24, 26.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An extendable holding device for a supply line in an aircraft, the holding device comprising:

a supply line holding unit;

a fastener; and an adaptable spacer;

wherein the supply line holding unit comprises an at least partly enclosed holding opening for holding a supply line;

wherein the fastener is configured to mount the supply line holding unit to a support structure;

wherein the adaptable spacer is configured to be arranged between the supply line holding unit and the support structure to which the holding device is to be mounted;

wherein the adaptable spacer is extendable in a longitudinal direction of the fastener and is temporarily lockable at least at a first and a second predetermined length;

wherein the adaptable spacer is extendable by a first spacer member and a second spacer member; and wherein the fastener extends through each of supply line holding unit, the first spacer member, and the second spacer member.

2. The holding device according to claim 1, wherein the first spacer member is lockable at the second spacer member at least at the first and the second predetermined length; and wherein the first and the at least second spacer member have a disengaged state between at least the first and the second predetermined length and are continuously shiftable in the longitudinal direction with respect to each other.

3. The holding device according to claim 2, wherein at least one of the first spacer member and the at least second spacer member comprises locking elements for locking the adaptable spacer at least at the first and the second predetermined length.

4. The holding device according to claim 3, wherein the locking elements at the first spacer member are complementary to the locking elements at the at least second spacer member.

5. The holding device according to claim 3, wherein the locking elements are arranged in a staggered pattern at at least one of the first spacer member or the at least second spacer member to reinforce the locking of the first and the at least second spacer member.

6. The holding device according to claim 3, wherein the locking elements are configured, such that their locking is enabled by a preload force.

7. The holding device according to claim 3, wherein at least a part of the adaptable spacer encloses the fastener; and wherein the locking elements are configured to be secured by the fastener to prevent disengagement of the locking of the first and the second spacer member.

8. The holding device according to claim 3, wherein the first spacer member is formed as a primary hollow cylinder, providing an inner volume;

wherein the at least second spacer member is formed as secondary hollow cylinder, being insertable into the inner volume of the primary hollow cylinder;

wherein the secondary hollow cylinder encloses the fastener in its inner volume;

wherein the locking elements are provided from a primary and a secondary hollow cylinder wall; and wherein the fastener secures the locking elements of the secondary hollow cylinder wall against the locking elements of the primary hollow cylinder wall.

9. The holding device according to claim 2, wherein the first spacer member and the at least second spacer member are rotatably locked in relation to each other;

wherein the first spacer member or the at least second spacer member comprises a guiding groove and the other member comprises a guiding pin engaged with the guiding groove; and wherein the guiding groove and guiding pin prevent a separation of the first spacer member and the at least second spacer member.

10. The holding device according to claim 2, wherein at least one of the first spacer member or the at least second spacer member comprise insertion aiding elements at their end portions to facilitate insertion of the at least second spacer member into the first spacer member.

11. The holding device according to claim 1, wherein the adaptable spacer comprises at least one marker element at at least one of the first or second predetermined length; and wherein the marker element is configured for indicating a length between the supply line holding unit and the support structure.

12. A supply line arrangement, comprising:

an extendable holding device according to claim 1;

the supply line; and the support structure;

wherein the supply line is mounted onto the support structure by the extendable holding device in a distance defined by the extendable holding device.

13. An energy supply system comprising:

at least one supply line arrangement according to claim 12; and a power source;

wherein the power source is connected to the at least one supply line arrangement to supply electric energy to power consuming loads.

14. An aircraft, comprising:

at least one energy supply system according to claim 13; and at least one power consuming load;

wherein the least one power consuming load comprises at least one of a group comprising: a propulsion system, electric avionic equipment and onboard electric devices for a cabin area; and wherein the least one power consuming load is powered by the at least one energy supply system.

15. A method for providing an extendable holding device for a supply line in an aircraft, comprising the following steps:

providing a supply line holding unit;

providing a fastener; and providing an adaptable spacer;

wherein the supply line holding unit comprises an at least partly enclosed holding opening for holding a supply line;

wherein the fastener is configured to mount the supply line holding unit to a support structure;

wherein the adaptable spacer is configured to be arranged between the supply line holding unit and the support structure to which the holding device is to be mounted;

wherein the adaptable spacer is extendable in a longitudinal direction of the fastener and is temporarily lockable at least at a first and a second predetermined length;

wherein the adaptable spacer is extendable by a first spacer member and a second spacer member; and wherein the fastener extends through each of the supply line holding unit, the first spacer member, and the second spacer member.

16. An extendable holding device for a supply line in an aircraft, the holding device comprising:

a supply line holding unit;

a fastener; and an adaptable spacer;

wherein the supply line holding unit comprises an at least partly enclosed holding opening for holding a supply line;

wherein the fastener is configured to mount the supply line holding unit to a support structure;

wherein the adaptable spacer is configured to be arranged between the supply line holding unit and the support structure to which the holding device is to be mounted;

wherein the adaptable spacer is extendable in a longitudinal direction of the fastener and is temporarily lockable at least at a first and a second predetermined length;

wherein the adaptable spacer is extendable by a first spacer member and a second spacer member;

wherein the first spacer member is lockable at the second spacer member at least at the first and the second predetermined length;

wherein the first and the at least second spacer member have a disengaged state between at least the first and the second predetermined length and are continuously shiftable in the longitudinal direction with respect to each other;

wherein at least one of the first spacer member and the at least second spacer member comprises locking elements for locking the adaptable spacer at least at the first and the second predetermined length;

wherein at least a part of the adaptable spacer encloses the fastener; and wherein the locking elements are configured to be secured by the fastener to prevent disengagement of the locking of the first and the second spacer member.

* * * * *